United States Patent [19]

Vinokur

[11] 4,067,175
[45] Jan. 10, 1978

[54] DEVICE FOR SEALING CONTAINERS MADE OF HEAT-SEALABLE MATERIAL

[76] Inventor: Isaac Vinokur, Ave. Forest 1485, 7°A Buenos Aires, Argentina

[21] Appl. No.: 725,915

[22] Filed: Sept. 22, 1976

[30] Foreign Application Priority Data

Aug. 4, 1976 Argentina ............................ 264207

[51] Int. Cl.² ........................ B65B 51/14; B65B 51/26
[52] U.S. Cl. .................................... 53/373; 53/180 R; 156/583
[58] Field of Search ............ 53/180 R, 180 M, 182 R, 53/182 M, 373; 156/583; 219/243

[56] References Cited

U.S. PATENT DOCUMENTS

| | | | |
|---|---|---|---|
| 2,916,864 | 12/1959 | Meissner | 53/180 |
| 3,050,916 | 8/1962 | Gausman et al. | 156/583 X |
| 3,438,173 | 4/1969 | Omori | 53/373 X |
| 3,673,041 | 6/1972 | Schulz et al. | 53/373 X |
| 3,874,146 | 4/1975 | Watkins | 53/182 M |

*Primary Examiner*—Robert Louis Spruill

*Attorney, Agent, or Firm*—Ladas, Parry, Von Gehr, Goldsmith & Deschamps

[57] ABSTRACT

A device for sealing containers made of heat-sealable material particularly adapted to be applied to the closure of containers containing pasty substances including an elastic support for one of the two walls of the container which are to be heat-sealed to one another and an assembly which is movable towards the mean plane of the container. The assembly includes a head on which the slidably mounted two rigid plane members in convergent positions so as to have sharp edges in substantial engagement. The head having mounted between both rigid plane members a heating mechanism which due to the movement of the head relative to the members the heating mechanism is placed against the other wall of the container in the position in which the members are pressing the walls against the elastic support. The present invention further includes a mechanism for causing the movement of the moveable assembly towards the elastic support and for causing the movement of the rigid plane members relative to the head.

3 Claims, 2 Drawing Figures

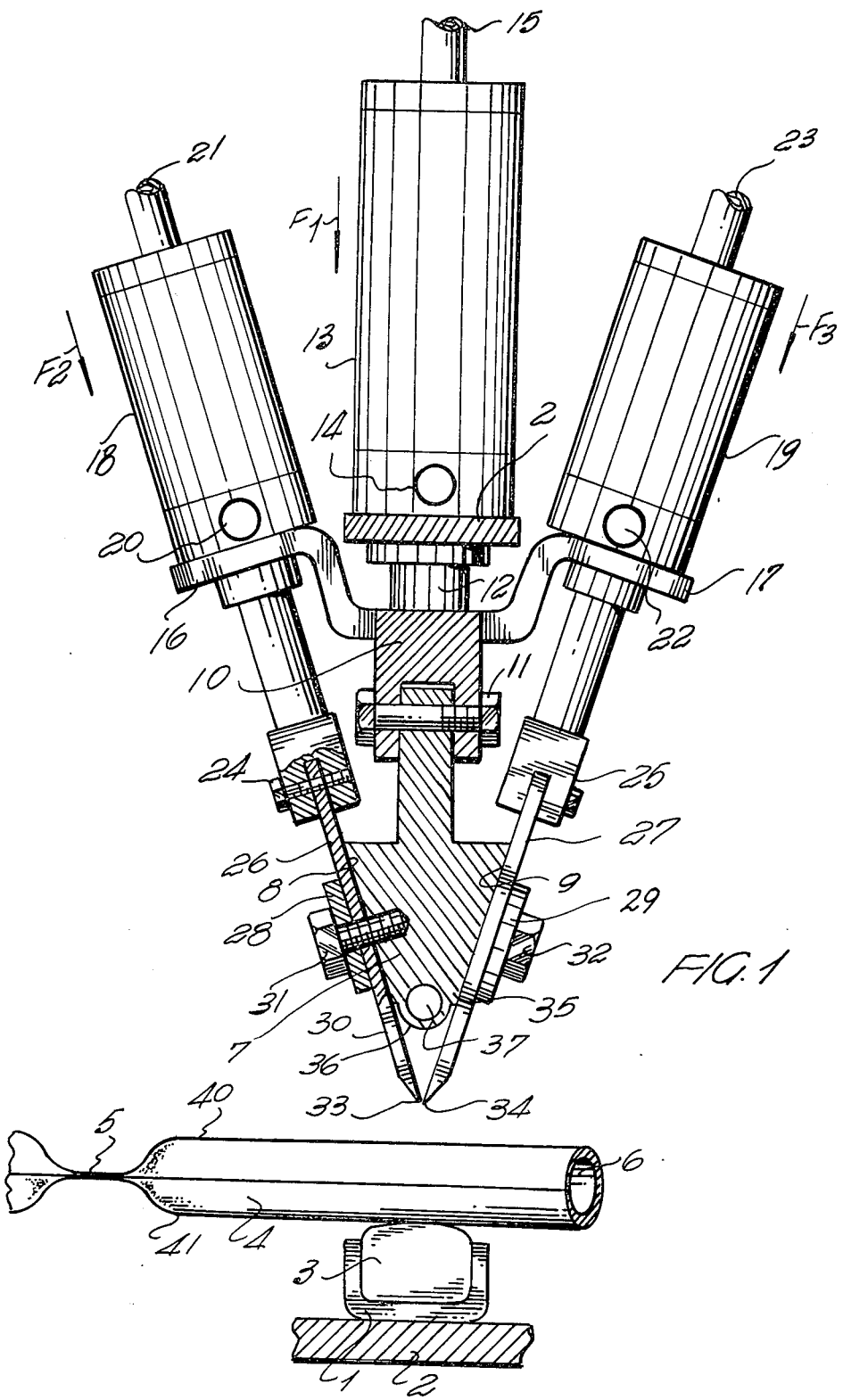

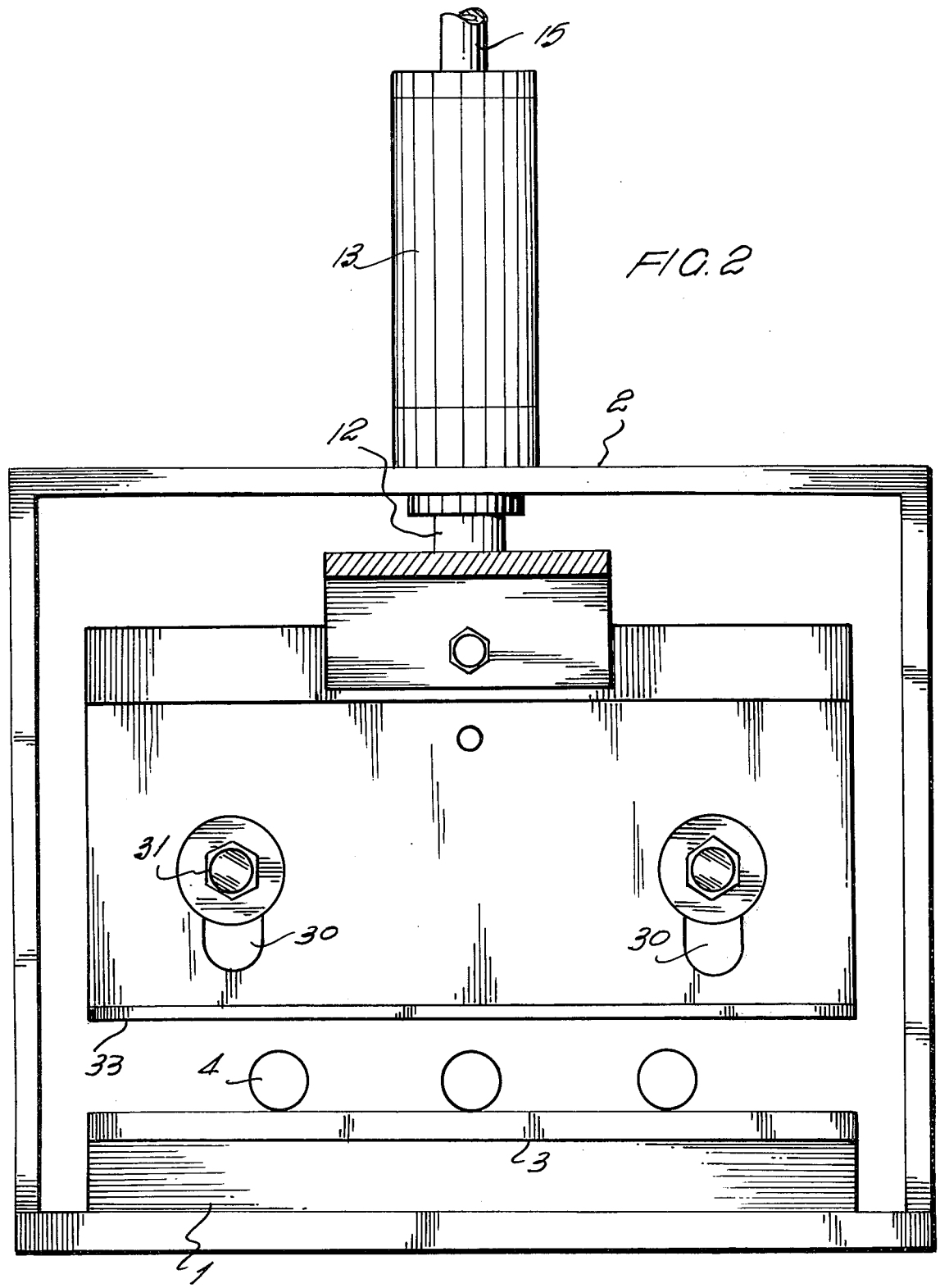

DEVICE FOR SEALING CONTAINERS MADE OF HEAT-SEALABLE MATERIAL

This invention relates to a device for sealing containers made of heat-sealable material and is specially designed to be applied to the closure of such containers and particularly to the closure of containers containing pasty fat substances such as minced meat, grease and/or components normally used in the manufacture of sausages and the like.

The heat-sealing of heat-sealable material is extremely difficult if between the opposed faces of the parts to be sealed foreign particles are interposed, especially when these are of grease and similar materials. Thus, heat-sealable containers containing fat materials have to be very carefully sealed with the help of metal bindings or rings which is not only costly but also unable to guarantee absolute air-tightness.

The device of the invention, by its particular and novel constitution makes it possible to obtain an absolutely airtight sealing of heat-sealable materials at less cost than the known devices utilized at present. On the other hand, the device of this invention permits to maintain under pressure the contents of the container thus avoiding the entrance of air into the same, which may be important in some processes of producing and packing food products.

Due to the particular and novel constitution of the device of the invention the sealing operation starts with a sweeping of the paste occupying the zone to be sealed, between the two parts making up the container, stretching at the same time said container parts in the zone where the joint is to be made. Only at the end of the operations described the heater acts to produce the heat-sealing.

Simultaneously with the sweeping and stretching both parts to be joined are pressed together, avoiding communication between the portions of the container which are situated before and after the sealing device, thus obtaining a transitory mechanical seal until the heat-sealing is carried out, avoiding pressure losses of the paste filling the container and eventual entries of air into the container.

Thus, an object of the invention is a device for sealing containers, the device comprising elastic support means for one of the walls of the container which are to be sealed to one another; an assembly movable perpendicularly to the mean plane of the container, said assembly being composed of a head on which are slidable mounted two plane convergent members so as to have opposed edges, said head carrying between both plane members a heating means placeable between said edges in order to press against the outer face of the other part of the container, in the position of engagement of said edges with said face.

Another object of the invention is to provide in the head and adjacent to the heater a passage for a cooling fluid to cool quickly the heat-sealed parts.

In the annexed drawings:

FIG. 1 is a side elevation of the device of this invention; and

FIG. 2 is a frontal view of the device illustrated in FIG. 1.

The device of the invention will now be described with the reference to the drawings. It comprises a support 1 mounted on a framework 2; on the support is mounted an elastic member 3, e.g. a rubber band, on which may rest the zone to be heat-sealed of a wrapping 4, filled, e.g. with a pasty material which has been injected under pressure and, until the heat-sealing is carried out, is contained in a front portion 5 which has previously been sealed by a prior action of the device and with the same injection nozzle 6 of an injection device such as described e.g. in the copending application number.

A trapezoidal head 7 having two lateral faces 8, 9 convergent toward the elastic member 3 is situated opposite the same. Said head 7 is secured to the support 10 by a bolt 11, and said support 10 is mounted on a stem 12 connected to the rod of the actuating cylinder 13 fixed to the frame 2 of the device. The actuator 13 may be a hydraulic or pneumatic double-action cylinder controllable through the channels 14 and 15 by means of which the cylinder is energized to move in the direction of the arrow $f_1$ or in reverse.

From the support 10 extend in opposite directions members 16 and 17 supporting the cylinders 18 and 19 whose axes converge towards a point of the straight line where the faces 8 and 9 of the head 7 intersect. The cylinders 18 and 19 may be like the cylinder 13, hydraulic or pneumatic and double-action, and the movement of their pistons is determined by the channels 20, 21 and 22, 23, respectively, by which each of the cylinders is connected to a source of pressurized fluid.

On each of the piston rods of the cylinders 18 and 19 is fixed by a coupling 24 and 25, respectively, a rigid plane plate 26 and 27, respectively, engaging the lateral faces 8 and 9 of the head 7 and guided along the same by guide members 28 and 29, respectively, in which the said; plates slide along elongated openings 30; said guide members are held to the head by bolts 31 and 32, respectively.

In normal position, as shown in FIG. 1, the edges of the rigid plane plates 26 and 27, opposite the elastic member 3, are sharp and remain substantially in engagement, as may be seen in said figure, due to the inclination of the faces 8 and 9 of the head 7. Said edges are indicated by the references 33 and 34.

If the cylinder 13 is actuated so as to move its piston in the direction of the arrow $f_1$, the wrapping 4 resting on the elastic member 3 in the zone where the seal has to be made, the edges 33 and 34 engage the top of the wrapping 4 and, while pressing against the same push the paste inside the wrapping towards the front and towards the back until the part 40 of the wrapping rests on the part 41 without any paste remaining between them, due to the high pressure of the sharp edges against the wrapping, which pressure moves the paste in said directions. At the same time, the front portion of the wrapping with its contents of paste separates from the back portion. Said front portion lies in the zone between the shape edges 33, 34 and the sealing 5 corresponding to the portion sealed in a prior operation, while the back portion lies between said compressed zone and the injection nozzle 6.

This situation permits to maintain the injection pressure both in the front part and in the back part, the edges 33 and 34 acting as an airtight seal preventing communication between both parts.

The face 35 of the head 7, which is situated opposite the edges 33, 34, carries a heater 36 which may be elastically attached to the head 7 so as to absorb the expansions caused by a rise in temperature; the said heater may be energized electrically, in which case it has to be electrically insulated from the rest of the head. However, the heater may be of any other suitable type without departing from the scope of this invention. A conduit 37 for a cooling fluid is provided inside the head 7 adjacent to the heater 36.

When the assembly is in the position in which the sharp edges 33, 34 press the parts 40 and 41 of the wrapping against the elastic member 3, the head is further advanced in the direction of the arrow $f_1$ and simultaneously the cylinders 18 and 19 are energized so as to move the couplings 24 and 25 contrary to the direction indicated by the arrows $f_2$ and $f_3$, overcome by the superior pressure of cylinder 13. Thus the head will advance relative to the rigid plates 26 and 27 whose edges will separate with the consequent sweeping action and exposing a portion of part 40 to the action of the heater, as the head in its advance will engage the heater with the parts 40 and 41 of the wrapping and carry out the desired heat-sealing.

Having completed this operation, cooling fluid may be circulated through the conduit 37, cooling the seal, after which the cylinder pistons will be moved in reverse to the direction already described in order to return the assembly to its starting position and let the wrapping advance to a new sealing position.

What I claim is:

1. A device for sealing containers made of heatsealable material, particularly suitable for the closure of containers containing pasty fat substances, comprising an elastic means for supporting one of the two walls of the container which are to be heat-sealed to one another, an assembly movable towards the mean plane of said container, said assembly including a head on which are slidably mounted two rigid plane members on either side thereof which are downwardly and inwardly convergent such that the lower portions thereof may be in substantial engagement with each other, the lower edges of each plane member being tapered to a sharp point, said head having mounted thereon at the lower portion thereof a heating means such that movement of said head downwardly relative to said members places said heating means into engagement with the outer wall of the container and pushes the container into engagement with said elastic support, said downward movement of said head further moving said members away from each other while said members engage the upper wall of the container, the angle of said members being maintained constant during said movement and said plane members remaining in coextensive engagement with the respective surfaces of said head, means for causing the movement of the assembly towards said elastic support, and means for causing the movement of said rigid plane members relative to the head.

2. A device for sealing containers according to claim 1, wherein said head is an elongated body having a trapezoidal cross section, said rigid plane members being slidably mounted on the opposing inclined faces of said body.

3. A device for sealing containers according to claim 2, wherein the means for causing the movement of the head include a first double-action cylinder actuated by fluid pressure through corresponding channels for movement towards the elastic support and in reverse, the means for causing the movement of said rigid plane members relative to the head including two doubleaction cylinders each mounted on a support attached to the first cylinder, with their axes parallel to each of the inclined faces of the section of the head, each of said cylinders being connected to a source of fluid pressure through respective channels for moving the piston of each cylinder in either direction, with their respective rods coupled to each of said rigid plane members.

* * * * *